S. A. DONALDSON.
SWINGLETREE.
APPLICATION FILED OCT. 19, 1920.
1,368,123. Patented Feb. 8, 1921.
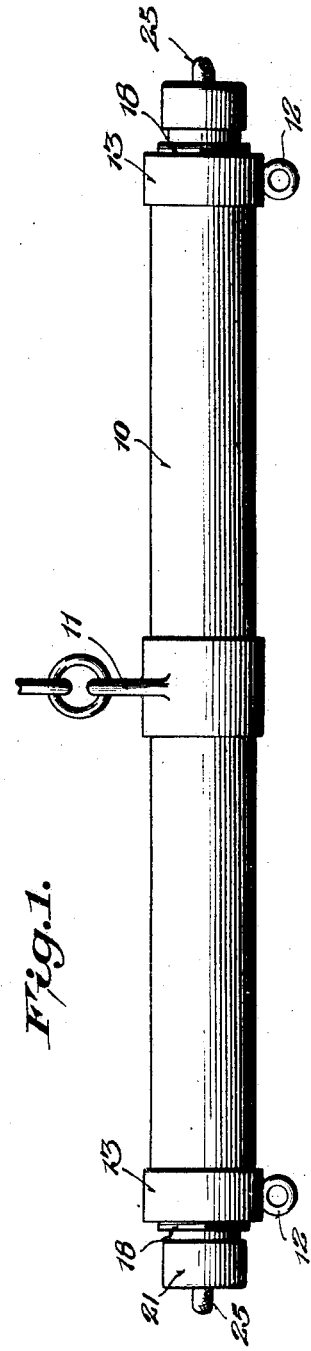
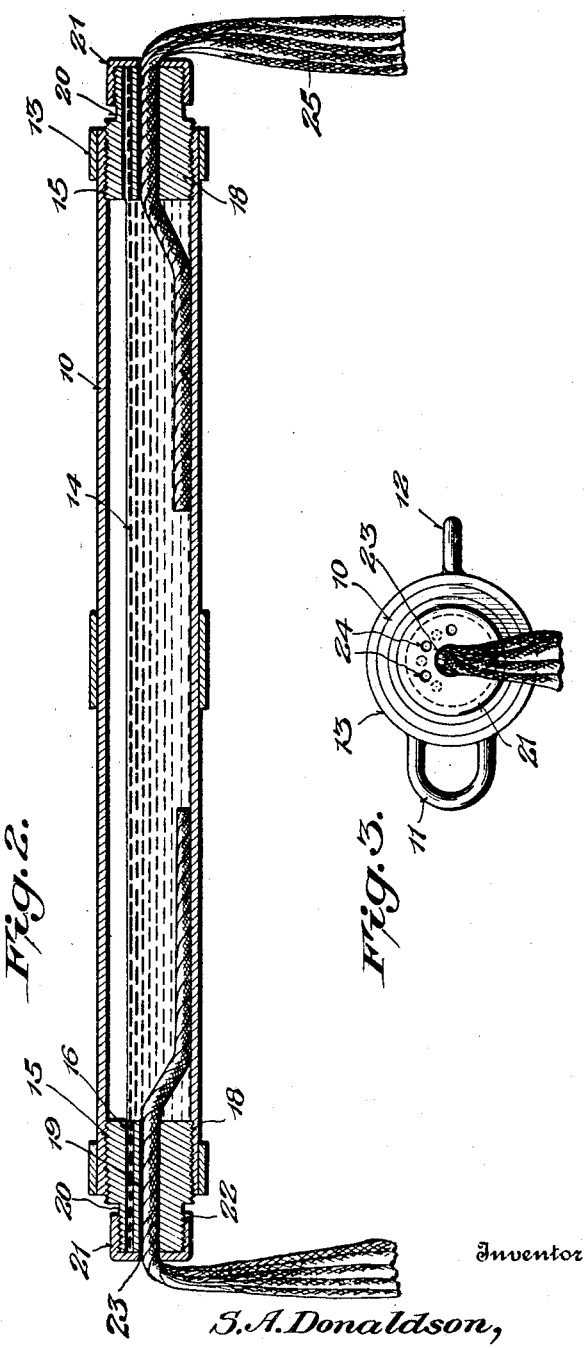
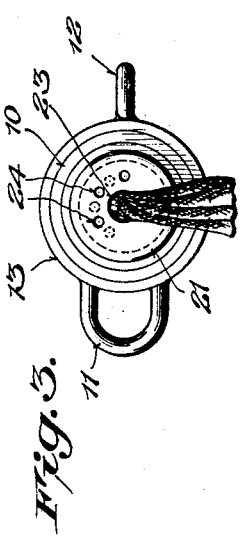
Inventor
S. A. Donaldson,

UNITED STATES PATENT OFFICE.

SAMUEL A. DONALDSON, OF PHIL CAMPBELL, ALABAMA.

SWINGLETREE.

1,368,123.   Specification of Letters Patent.   Patented Feb. 8, 1921.

Application filed October 19, 1920. Serial No. 417,922.

*To all whom it may concern:*

Be it known that I, SAMUEL A. DONALDSON, a citizen of the United States, residing at Phil Campbell, in the county of Franklin and State of Alabama, have invented new and useful Improvements in Swingletrees, of which the following is a specification.

This invention relates to an improvement in swingletrees, and contemplates the provision of a swingletree adapted, particularly, for use upon vehicles which are employed in agricultural pursuits.

It is an object of this invention to provide a swingletree having means to receive an insecticide, and means whereby the insecticide may be distributed upon vegetation.

Another and more detailed object of the invention is the provision of insecticide distributing means upon the swingletree which will efficiently distribute the insecticide upon vegetation of various types, and will operate efficiently no matter to what height the vegetation may grow.

The above and other objects of a more minute and obvious character, which will become apparent as the description proceeds, are attained by the provision of a swingletree having a storage chamber therein for containing an insecticide and having a drip opening whereby the insecticide may gravitate upon the vegetation. More specifically the invention contemplates the provision of an absorbent member adapted to hang from the swingletree so as to engage the vegetation and position it so as to be saturated with the insecticide that flows from the swingletree.

Referring to the accompanying drawings, wherein there is shown one form of device in which the invention may be embodied, Figure 1 is a plan view, Fig. 2 is a longitudinal cross-section, and Fig. 3 is an end elevational view.

In the drawings, 10 indicates a swingletree provided with the usual center eye 11, by means of which the swingletree may be connected to the vehicle, and also having attached thereto the customary end eyes 12 formed upon bands 13 which encircle and are secured to the body of the swingletree. The swingletree is shown as being hollow throughout so as to provide an interior storage chamber 14 into which a suitable insecticide may be placed. At each end the swingletree may be internally threaded as at 15 and fitted with a plug 16 which is peripherally threaded as at 18 so as to be removably positioned in the end of the device. The plug is formed with a central bore or passage 19 extending therethrough, and also has a plurality of supplemental passages 20 which are radially positioned with relation to the central bore, and may be opened and closed, as desired, by means of a cap 21 which is screwed upon the reduced outer end 22 of the plug which projects without the swingletree. It will be observed that the cap is formed with a central opening 23 which registers with the bore 19 of the plug, and also has additional openings 24 corresponding in number to the openings 20 in the plug and adapted to be brought to and from registry with the latter mentioned openings by rotation of the cap.

In order to efficiently saturate the vegetation with an insecticide placed within a swingletree, a length of absorbent material 25, formed preferably from a number of loose strands, are placed within the plug so as to extend into the hollow body of the swingletree and to hang loosely from the end of the swingletree so as to engage the vegetation upon which the insecticide is to be distributed. Obviously, the absorbent material may be of any length desired, and may be adjusted in the opening so as to hang for any suitable distance from the swingletree, the length of the material hanging from the swingletree being dependent upon the height to which the vegetation grows.

In using the device the chamber 14 may be filled by removing one of the plugs which, subsequent to the filling operation, is replaced, and each of the wicks are adjusted to the desired height. Since the wicks do not tightly fit within the openings 19 it will, generally, be found that a sufficient amount of the insecticide will flow through this opening to maintain the wicks, at all times, thoroughly saturated. If, however, it is found desirable to increase the amount of insecticide upon the wicks, the cap 21 is adjusted so that additional amounts may flow through the openings 16 and drip upon the wicks.

It will be understood, of course, that the device shown in the accompanying drawings and herein described in detail is merely illustrative of the invention, and that such modifications may be made therein as come within the scope of the following claims.

I claim:

1. A swingletree having means for containing a quantity of insecticide, and a drip opening whereby the insecticide may gravitate upon vegetation.

2. A swingletree having a chamber therein for the storage of an insecticide, and a drip opening through which the insecticide may gravitate upon vegetation.

3. As an article of manufacture, a swingletree having a chamber for the storage of an insecticide, a drip opening through which the insecticide may flow, and an absorbent member connected to said swingletree in position to be saturated by the insecticide flowing through said opening and to engage vegetation.

4. As an article of manufacture, a swingletree having a chamber therein for the reception of an insecticide, a drip opening, and an absorbent member in said opening having a portion extending into the insecticide chamber and another portion hanging freely to engage vegetation.

5. A swingletree having an insecticide reservoir therein, a drip opening in one end thereof, and a length of absorbent material extending through said opening into said chamber and hanging from the end of the swingletree to engage vegetation.

6. A hollow swingletree adapted to receive an insecticide therein and having a drip opening in one end thereof, a length of absorbent material extending through said opening into the swingletree and hanging from the end of the swingletree, said swingletree having a supplemental drip opening adjacent said first-mentioned opening, and means for opening and closing said supplemental opening as desired.

7. A hollow swingletree having a plug removably secured in the end thereof, said plug having a central bore extending therethrough, supplemental passages extending through said plug and radially disposed with relation to said central bore, an absorbent member in said bore hanging freely from the end of the swingletree and extending into the interior of the swingletree, and means for opening and closing said supplemental passages when desired.

In testimony whereof I have hereunto set my hand.

SAMUEL A. DONALDSON.